3,706,572
PROCESS FOR AGGREGATING PRELIGHTENED COFFEE COMPOSITIONS
William J. Einstman, Port Chester, and George B. Ponzoni, Spring Valley, N.Y., and Richard J. Leonard, Wayne, N.J., assignors to General Foods Corporation, White Plains, N.Y.
No Drawing. Filed Aug. 19, 1970, Ser. No. 65,344
Int. Cl. A23f 1/08
U.S. Cl. 99—71                                                                                    5 Claims

ABSTRACT OF THE DISCLOSURE

Prelightened, soluble coffee agglomerates are prepared by grinding powder comprising soluble coffee solids and coffee lightener solids to a particle size between about 90 microns and 150 microns and then agglomerating the ground powder. The coffee products produced in this manner have both a commercially acceptable appearance in glass jars and a good brew appearance in the cupped beverage.

BACKGROUND OF THE INVENTION

This invention relates to an improved prelightened soluble coffee product and more particularly to the method of preparing such a product.

At present there is available on the market several different coffee powders from which a cup of coffee can be made by mixing about a teaspoon of the coffee powder with a cup of boiling water. In using any of these mixes, however, a coffee drinker who is accustomed to using cream with his coffee must add the cream separately. Alternatively, if he desires, he can use one of several non-dairy coffee lighteners which are sold to the public. But in either case he must keep on hand not only the powdered coffee, but also the cream or cream substitute.

Many previous attempts to prepare a prelightened soluble coffee have not proven to be commercially successful. Some of these products have been little more than a dry blend of soluble coffee solids and coffee lightening solids. Other products have been prepared by either agglomerating a mixture of soluble coffee solids and the lightener solids or spray-drying a mixture of coffee percolate and liquid coffee lightener.

Since soluble coffees are normally sold in clear glass containers, it has long been the desire to produce soluble coffee products that will present the granular or chunky appearance of roasted and ground coffee. Consumer studies show that there is a preference for soluble coffees which exhibit a dark brown color and granular particle appearance. Regular soluble coffees have been able to obtain these properties by means of the now well-known agglomeration technique. Problems have arisen, however, when prelightened coffee products have attempted to simulate this same type of appearance.

Agglomerated, prelightened coffee products which are produced either by agglomerating a blend of finely ground spray-dried coffee solids and unground spray-dried lightener solids or by agglomerating the solids obtained from spray-drying a mixture of coffee percolate and liquid coffee lightener have been disclosed in U.S. Pat. No. 3,458,319, issued to Block et al. The prelightened coffee products of the Block et al., patent do not, however, achieve the brown color and granular particle appearance preferred by the consumer.

It has been found that improved appearance for the agglomerated product can be obtained if the prelightened coffee mixture is finely ground in a mill to a particle size of less than about 50 microns before it is introduced into the agglomerator. This grinding step was conducted in a manner similar to that disclosed in U.S. Pat. No. 3,227,558 to Richmond, wherein the coffee solids and lightener solids were thoroughly blended and then finely ground. Alternatively the grinding operation could be performed separately on the spray-dried coffee solids and the lightener solids, with subsequent blending of these ground particles.

The agglomerates obtained with the above fine grinding methods possess a desirable brown color, and as might be expected, are readily dissolved in water. However, it has been discovered that these agglomerated prelightened coffee products which include non-dairy lightener solids do not produce an attractive coffee beverage when dissolved in hot water. The beverages so produced exhibit an unsightly appearance due to the presence of a particulate white flock or insoluble white particles on surface of the resultant beverage.

SUMMARY OF THE INVENTION

It has been discovered that if prelightened coffee material is ground to only an intermediate particle size prior to agglomeration, wherein substantially all of the particles are between about 90 microns and 150 microns, the problem of flocking in the cup can be avoided. This result is thought to be due to the absence of a rigorous grinding operation during which a portion of the protein (e.g. sodium caseinate) shell which normally surrounds each of the spray-dried, non-dairy lightener particles is removed. It is this disrupted protein which is thought to produce the white flock in the coffee beverage.

It is an object of this invention to produce a prelightened coffee product which exhibits a desirable brown color and a granular particle appearance.

It is a further object of this invention to produce a prelightened coffee product which presents a pleasing appearance in a glass jar and which will also cup to a clean appearing coffee beverage when dissolved in hot water.

DESCRIPTION OF THE INVENTION

A commercially acceptable prelightened coffee powder is produced by agglomerating a substantially homogeneous blend containing on a percent weight basis from 35% to 55% soluble coffee solids and from 45% to 65% soluble lightener solids, wherein substantially all the solids in the blend (i.e. prior to agglomeration) possess a particle size between about 90 microns and 150 microns, and preferably between about 100 microns and 125 microns. The products of this invention will exhibit a pleasing brown and granular appearance, will cup to a clean, lightened, pleasant-tasting coffee beverage and will readily dissolve in hot water, without the formation of any lumps or curdling.

Suitable lightener solids are the spray-dried, non-dairy liquid lighteners which include an emulsified edible, low-melting-point fat, especially the vegetable fats such as hydrogenated palm kernel oil. High melting fats (above about 110° F.) tend to produce a heavy bodied lightener of poor palatability. Liquid fats are unsuitable because the emulsified fat tends to coalesce in the powdered lightener. The emulsified fat level determines the lightening power of the lightener formulation and a level in the range of 20% to 50% on a dry weight basis is found to be satisfactory with a level of about 40% being preferred.

Commercial emulsifiers, such as the mono and diglycerides, alone or in combination with the partial long chain fatty acid esters of a polyoxyethylene derivative of hexitans, and the like, are included in the lightener so that a stable fat emulsion will exist in the lightener.

A water dispersible protein material such as sodium caseinate is an important component of the lightener in order to impart a milk or cream-like character and taste to both the lightener itself and more importantly to the lightened coffee beverage. The caseinates have been found to be an ideal source of protein since these materials possess a natural emulsifying property which is thought to aid in forming a stable emulsion in the lightener. This emulsifying property of these protein materials is desirable since it has been found that some of the commercial emulsifiers tend to lose emulsifying power during spray drying. Sodium caseinate has been found to be the preferred protein material. Calcium caseinate can be used, but it is less rapidly dissolved in the aqueous phase and is less stable to separation than sodium caseinate. Potassium caseinate may be used for low sodium lighteners, and soybean proteinate is useful if an all vegetable product is desired.

A water soluble carbohydrate is added to the lightener to serve as a carrier for the fat and also to act as a bodying agent and to impart a slight sweetness effect. The carbohydrate can be of any type, such as for example, sugars or corn syrup solids but it has been found that corn syrup solids have been preferable since they are substantially less sweet than a sugar such as sucrose.

A small amount of buffering agents should also be included in the lightener to counteract the acidity of the coffee which otherwise might be sufficient to precipitate a certain amount of the protein, thereby causing what is known in the art as "feathering." Care must be taken in the selection of both the amount and type of buffering agents employed, if the development of off-flavors is to be prevented. The use of more than about 4% of buffering agents in the solid lightener formulation will normally be detectable to the taste. The most common buffering agents are the phosphates such as dipotassium phosphate and sodium tripolyphosphate. It has been found, however, that between about 1% and 3% of sodium citrate is desirable as one of the buffer agents since it is especially effective in preventing "feathering" when water above 180° F. is used to prepare the coffee beverage.

The lightener may also contain a small but effective amount of a sequestering agent in order to minimize any appearance problems in the coffee beverage due to the use of hard water. Typical sequestering agents are sodium hexametaphosphate (Calgon RS) and disodium ethylene diamine tetraacetate.

It may also be beneficial to pre-treat the water used in the formation of the liquid lightener prior to spray drying. Such pre-treatment may consist of distillation, mineral addition or buffering. These steps should further assist in lowering the acidity of the prelightened coffee beverage thereby decreasing the probability that any undissolved protein material will appear in the prelightened coffee beverage.

In addition to the basic formulation, minor amounts of color and flavor additives may be included as permitted by law. The production of a golden hue in the final coffee beverage is especially desired in order to present a pleasing appearance to the consumer. It has been found that the use of yellow type coloring agents such as beta carotene and tartrazine are especially useful in producing the desired color. Various cream flavors have been found useful as flavor additives.

Suitable formulations for the spray dried lightener solids used in this invention are described but not limited by the following compositions:

|  | Percent |
|---|---|
| Water soluble carbohydrate | 35 to 65 |
| Vegetable fat | 20 to 50 |
| Water dispersible protein | 3 to 15 |
| Buffer agent | 1 to 4 |
| Emulsifier | 0.5 to 3 |
| Sequestering agent | 1 to 3 |

A process for the production of the lightener solids comprises forming a liquid lightener formulation of about 50% to 70% solids concentration by maintaining water in a blend tank at about 160° F., and mixing therewith the water dispersible proteins, water soluble sugars, buffering agents and color and flavor additives. Next a pre-blended mix of the melted fats and emulsifiers is blended into the tank while the elevated temperature is maintained. This blended formulation is fed through a homogenizer where a stable emulsion is formed and then passed onto a spray drier where the dried lightener solids are produced. The conditions for spray drying will be readily apparent to those skilled in the art.

It has been found that when the blended lightener formulation is elevated to the temperature of about 160° F. a good homogenization efficiency is achieved, and ordinarily a single pass through a commercial homogenizer will be sufficient to produce a thoroughly homogenized blend. Ideally the temperature of the homogenized lightener should be about 180° F. just prior to its entry to the spray drier. This elevated temperature of 180° F. is preferably achieved by the use of a heat exchanger since batch heating at 180° F. has been found to produce off-flavor build-up and discoloration.

It is possible to improve the flowability of the spray dried lightener solids by adding to the dry solids a small amount (about 1.5%) of a known anticaking agent such as sodium aluminum silicate.

These suitable dry lightener solids, such as spray-dried solids having a typical particle size distribution between 100 and 500 microns, are preferably blended with dry soluble coffee solids, such as conventional spray-dried coffee having a typical particle size distribution between 100 and 500 microns, to produce a substantially homogeneous blend. This coffee-lightener blend is then ground in accordance with the provisions of this invention whereby the particle size of the solids is reduced to a point where substantially all of the particles are between about 90 microns and 150 microns. This grinding may be done in conventional hammer mill under conditions which will be readily apparent to those skilled in the art.

Alternatively the dry lightener solids and the dry soluble coffee solids may be separately ground in accordance with this invention and thereafter the ground solids are uniformly blended.

The ground blends are agglomerated under suitable conditions such as those known and used by those skilled in the coffee art.

As previously indicated, acceptable products have been produced containing from 35% to 55% by weight of coffee. However, consumer studies have shown that the most desirable products should contain at least about 45% coffee. This is a convenient level since the consumer is easily able to measure about two teaspoons of the prelightened product in order to produce a cup of coffee equivalent in coffee taste to one teaspoon of regular instant coffee.

It has also been found that at a 45% coffee level it is desirable for the lightener to have a fat content of about 40% in order to produce the coffee beverage having the highest degree of consumer preference. The use of fat contents much above 45% will usually create emulsion problems as may be evidenced by the presence of free oil droplets on the surface of the lightened coffee beverage.

This invention is further illustrated but not limited by the following examples:

Example 1

| Lightener solids: | Weight percent |
|---|---|
| Corn syrup solids (24 D.E. Frodex) | 48.50 |
| Hydrogenated palm kernel oil | 40.00 |
| Sodium caseinate | 5.00 |
| Mono and diglycerides (Atmul 124) | 1.56 |
| Sodium citrate | 2.00 |
| Dipotassium phosphate | 1.34 |
| Sodium hexametaphosphate (Calgon, RS) | 1.60 |
| Flavor/color | As desired |

55 lbs. of these spray-dried lightener solids having an average particle size of about 290 microns are blended in a ribbon blender with 45 lbs. of spray dried soluble coffee having an average particle size of about 310 microns. The blend is then put through a Fitzpatrick hammer mill (Model D/6) with no screen at 2100 r.p.m. The resulting powder has an average particle size of about 120 microns, with substantially all the particles between about 90 microns and 150 microns. This co-ground mixture is then fed to an agglomerator at 400 lbs./hr. The agglomerator is operating with a steam nozzle pressure of 24 p.s.i., an air rate of 2300 cu. ft./min., an air inlet temperature of 420° F. and an air outlet temperature of 245° F. The resulting product achieves a bulk density of about 0.210 g./cc. with an average particle size of about 1400 microns.

Two teaspoons of this product are used to prepare one cup of coffee beverage by the addition of hot (about 200° F.) water. The resulting beverage has a clean appearance, a pleasant lightened color and a good taste.

Example 2

The process of Example 1 is followed with the exception that the Fitzpatrick hammer mill is operating at 7200 r.p.m. producing a powder having an average particle size of about 14 microns. The agglomerated product has an average particle size of about 1140 microns, a bulk density of about .245 g./cc.

A lightened coffee beverage made according to Example 1 with the product of Example 2 exhibits a lightened appearance, but shows some flocking in the cup.

Example 3

The conditions of Example 1 are repeated with a lightener in which sodium tripolyphosphate replaces the sodium citrate component. The resulting lightened coffee beverage exhibits some slight feathering when prepared with 200° F. water. No feathering is in evidence when the water is at 180° F.

Although this invention is described in relation to spray-dried coffee it is obvious that comparable powdered soluble materials such as freeze-dried coffee, decaffeinated coffee, tea, etc. may be employed.

It will be apparent that there are variations and modifications of this invention and that the examples, preferred proportions and ingredients, and typical operating conditions may be varied without departing from the scope of the invention.

Having thus described the invention what is claimed is:

1. A method for producing a prelightened coffee product containing from 35% to 55% soluble coffee and from 45% to 65% soluble lightener, comprising the steps of forming a substantially homogeneous blend of spray-dried coffee solids and spray-dried, non-dairy lightener solids, grinding the homogeneous blend to a point wherein substantially all the solids in the blend possess a particle size between 90 microns and 150 microns, and agglomerating said blend.

2. The method according to claim 1 wherein the lightener solids contain sodium citrate.

3. The method according to claim 1 wherein substantially all the solids in the homogeneous blend are between about 100 microns and 125 microns.

4. The method according to claim 1 wherein the homogeneous blend contains about 45% soluble coffee solids and about 55% soluble lightener solids.

5. The method according to claim 4 wherein the lightener solids contain about 40% by weight of fat.

References Cited

UNITED STATES PATENTS

| | | | |
|---|---|---|---|
| 3,458,319 | 7/1969 | Block et al. | 99—DIG 4 |
| 3,485,637 | 12/1969 | Adler et al. | 99—DIG 4 |
| 3,560,220 | 2/1971 | Bangert et al. | 99—63 |

FOREIGN PATENTS 688,859  6/1964  Canada.

OTHER REFERENCES

National Academy of Sciences, Chemicals Used In Food Processing, 1965, pp. 15 and 45.

FRANK W. LUTTER, Primary Examiner

W. L. MENTLIK, Assistant Examiner

U.S. Cl. X.R.

99—63, DIG 4